United States Patent Office 3,492,376
Patented Jan. 27, 1970

3,492,376
PHOSPHORIC ACID PHENOL ESTERS
Ernst Beriger, Allschwil, and Ludwig Ebner, Stein,
Aargau, Switzerland, assignors to Ciba Limited,
Basel, Switzerland, a company of Switzerland
No Drawing. Filed Nov. 29, 1966, Ser. No. 597,573
Claims priority, application Switzerland, Dec. 8, 1965,
16,895/65
Int. Cl. C07f 9/10; A01n 9/36
U.S. Cl. 260—964    3 Claims

ABSTRACT OF THE DISCLOSURE

Phosphoric acid phenol esters of the general formula

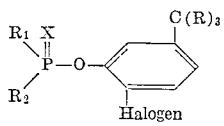

in which $R_1$ and $R_2$ are lower alkyl radicals which together have at most 5 carbon atoms and which may be bound to phosphorous through oxygen or sulphur, X represents oxygen or sulphur, and R represents a lower alkyl radical, useful in pesticidal preparations.

---

The present invention provides pesticidal preparations, which comprise, as active ingredient, one or more phosphoric acid phenol esters of the general formula

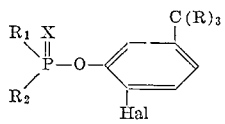

in which $R_1$ and $R_2$ each represents the same or different lower alkyl radicals which may be bound to phosphorus through oxygen or sulphur, containing together at most 5 carbon atoms, and X represents oxygen or sulphur, Hal represents flourine, chlorine, bromine or iodine, and R represents a lower alkyl radical, together with a carrier. The preparations may contain one of the following additives: a diluent, a vehicle, a solvent, a dispersant, a wetting agent, an adhesive, a fertilizer and/or other pesticides.

The pesticidal preparations of the invention are primarily intended for combating harmful insects, acarides, nematodes, molluscs, microorganisms, especially phytopathogenic fungi and bacteria, and more especially for controlling undersired plant growth.

Owing to their broad biocidal spectrum, the new preparations have the special advantage that they are suitable for combating a very wide variety of vegetable and animal pests.

They are not only suitable as herbicides but, when used in a concentration that does not produce phyttotoxicity, they display in plant protection an outstanding activity against harmful microoranisms, for example against fungi, for instance *Alternaria solani*, *Phytophtora infestans* and *Septoria apii*, and also harmful insects, acaridae, nematodes and their ova and larvae.

Furthermore, the new agents may be used quite generally as microbicides, for example against Aspergillus strains, and as insecticides, for example against midges and flies.

In the manufacture of solutions for direct spraying of the phosphoric acid esters of the general Formula I, there are suitable, for example, mineral oil fractions having a medium to high boiling range, for example diesel oil or kerosene, coal tar oil and oils of vegetable or animal origin, as well as hydrocarbons for example, alkylated naphthalenes, tetrahydronaphthalene, if desired in conjunction with xylene mixtures, cyclohexanols, ketones, also chlorinated hydrocarbons for example, trichlorethane and tetrachlorethane, trichlorethylene of tri- or tetrachlorobenzenes. It is advantageous to use organic solvents having a boiling point higher than 100° C.

It is especially advantageous to prepare aqueous forms of application from emulsion concentrates, pastes or wettable spray powders by the addition of water. Suitable emulsifiers or dispersants are nonionic products, for example condensation products of aliphatic alcohols, amines or carboxylic acids containing a long-chain hydrocarbon residue having about 10 to 20 carbon atoms, with ethylene oxide, for example, the condensation product of octadecyl alcohol with 25 to 30 mols of ethylene oxide, or of commercial oleylamine with 15 mols of ethylene oxide, or of soybean fatty acid with 30 mols of ethylene oxide, or of dodecylmercaptan with 12 mols of ethylene oxide. As suitable anionic emulsifiers, there may be mentioned: the sodium salt of dodecylbenzenesulphonic acid, the potassium or triethanolamine salt of oleic or abietic acid or of mixtures of these two acids, or the sodium salt of a petroleum-sulphonic acid. Suitable cationic dispersants are quaternary ammonium compounds, for example, cetyl pyridinium bromide or dihydroxyethylbenzyl dodecyl ammonium chloride.

When manufacturing dusting and casting preparations there may be used, as solid vehicles: talcum, kaolin, bentonite, calcium carbonate, calcium phosphate, or coal, cork meal, wood meal or other materials of vegetable origin. It is also very advantageous to manufacture the preparations in granular form. The various forms of application may also contain the conventional substances capable of improving the distribution, the adhesion, the stability towards rain or the penetration; as such substances there may be mentioned fatty acids, resins, glue, casein or alginates.

The preparations of this invention may be applied by themselves of in conjunction or admixture with conventional pesticides, especially insecticides, acaricides, nematocides, bactericides or further fungicides or herbicides.

Especially suitable for controlling undesired plant growth are the phosphoric acid esters of the formula

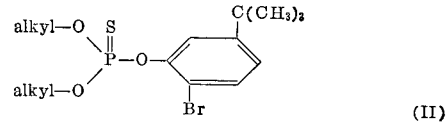
(II)

in which "alkyl" are alkyl radicals which together contain at most 5 carbon atoms.

The corresponding ortho-chloro and ortho-iodo compounds are likewise efficacious.

The new phosphoric acid phenol esters of the Formula I can be obtained by reacting a phosphoric acid derivative of the formula

(III)

wherein Halo is preferably a chlorine or bromine atom, and X represents oxygen or sulfur with a phenol of the formula

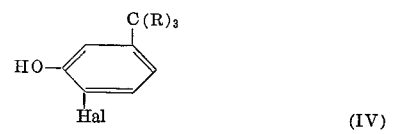
(IV)

wherein $R_3$ and Hal have the meanings given above or with a corresponding metal phenolate.

When the free phenol of the Formula IV is used, it is advantageous to heat the batch in the presence of an agent capable of combining with hydrohalides, for example, an alkali metal carbonate or bicarbonate, a tertiary base for example, triethylamine, or triethylenediamine.

The manufacture of esters in which $R_1$ and $R_2$ are bound to phosphorus through oxygen or sulphur, can be carried out by first reacting a phosphoric acid halide or a thiophosphoric acid halide with a meta-tertiary alkyl-ortho-halogeno-phenol, and then further reacting the resulting ester of the formula

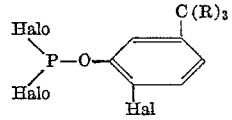
(V)

(in which Halo stands for chlorine or bromine and X and $R_3$ have the meanings given above) with an alcohol or thioalcohol corresponding to $R_1$ and/or $R_2$, preferably in the presence of a hydrogen halide acceptor and, if necessary, by slightly heating. The hydrogen halide acceptors used are, as in the first-named process, alkali metal carbonates or bicarbonates or tertiary bases.

According to the first-named process the following may be reacted: 3-tertiary butyl-6-chlorphenol, 3-tertiary butyl-6-bromophenol or -6-iodophenol with O,O-dimethyl-phosphoryl-chloride, O,O - dimethyl-thiophosphorylchloride, O,O - diethyl-phosphorylchloride, O,O - diethyl-thiophosphoryl-chloride, methyl-phosphonic acid-O-methylester-chloride, ethyl-phosphoric acid - O - methyl-esterchloride methyl-thiophosphonic acid - O - methylesterchloride, and ethyl-thiophosphonic acid-O-methylesterchloride.

Apart from 3-tertiary butyl-6-halogenophenols, other 3-tertiary alkyl-6-halogenophenols may be used, for example 3-tertiary amyl-6-halogenophenols and others.

The present invention includes also the new compounds of the general formula shown above.

The preparations of this invention are particularly suitable for the selective weed control in rice cultures.

The following examples illustrate the invention:

EXAMPLE 1

A mixture of 45.8 parts of 6-bromo-3-tertiary butyl-phenol, 32 parts of potassium carbonate and 1 part of copper powder in 150 parts by volume of methylethyl-ketone is stirred, then 32.1 parts of dimethylthiochloro-phosphate are dropped in at room temperature. The batch is then further heated for 8 hours at 70° to 80° C., and allowed to cool. The salts are filtered off, the filtrate is evaporated under vacuum and the residue is taken up in methylenechloride. The solution is washed with 2 x 50 parts by volume of ice-cold N-sodium hydroxide solution, dried over sodium sulphate, and the solvent is expelled under vacuum, towards the end under a high vacuum at 80 to 90° C. to leave as residue 49 parts of a compound corresponding to the formula (1) 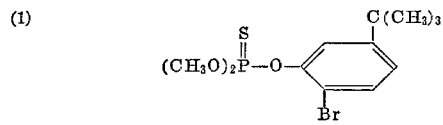

in the form of a pale yellow, clear liquid.

Analysis.—$C_{12}H_{18}BrO_3PS$. Calculated: Br, 22.6; P, 8.8; S, 9.1%. Found: Br, 22.3; P, 8.5; S, 8.9%.

By an analogous reaction of 6-bromo-3-tertiary butyl-phenol with diethylthiochlorophosphate, the compound of the following formula is obtained:

(2) 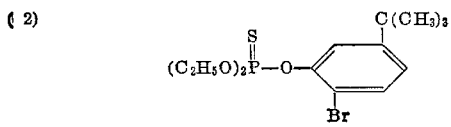

in the form of a pale yellow, clear liquid.

Analysis.—$C_{14}H_{22}BrO_3PS$. Calculated: P, 8.1%. Found: P, 8.1%.

The following compounds are manufactured by the process described in Example 1:

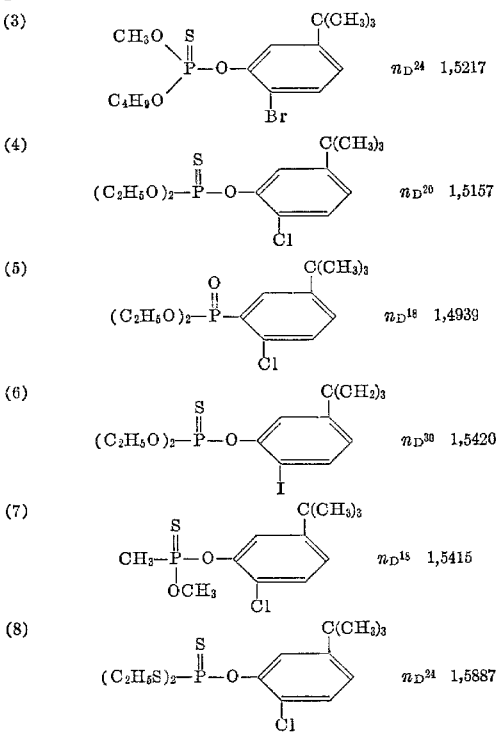

The halogeno-tertiary butylphenols used above are manufactured in the following manner:

(a) 150 parts of meta-tertiary butylphenol are dissolved in 200 parts by volume of glacial acetic acid and, during a period of 2 hours at a temperature within the range of from 15° to 20° C., are mixed with 160 parts of bromine. The solvent is expelled under vacuum and the residue distilled under a high vacuum, to yield 178 parts of 6-bromo-3-tertiary butylphenol boiling at 72° to 78° C., under 0.1 mm. Hg pressure.

(b) 150 parts of meta-tertiary butylphenol are dissolved in 200 parts by volume of chloroform and then heated in admixture with 135 parts of sulphurylchloride for 18 hours at a temperature within the range of from 40° to 50° C. The volatile constituents are expelled under vacuum and the residue distilled under a high vacuum, to yield 171 parts of 6-chloro-3-tertiary butyl-phenol boiling at 95° C. under 0.3 mm. Hg pressure.

(c) 75 parts of meta-tertiary butylphenol in 200 parts of volume of glacial acetic acid and 5 parts by volume of concentrated hydrochloric acid are heated to 80° C, 100 parts by volume of an iodine chloride solution of glacial acetic acid, containing 0.5 mol of iodine chloride are added. Then, during a period of 30 minutes at a temperature within the range of from 80 to 90° C., 200 parts by volume of water are added drop by drop, and the mixture is maintained for 2 hours at a temperature of from 80° to 90° C. The solvents are expelled under vacuum and the residue is distilled under a high vacuum, ot yield 117 parts of 6-iodo-3-tertiary butylphenol boiling at 87° to 89° C. under 0.07 mm. Hg pressure; after one recrystallization from hexane it melts at 46° to 47° C.

EXAMPLE 2

A mixture of 20 g. of the thiophosphoric acid ester of the formula

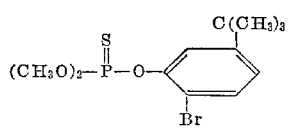

obtained in Example 1 and 5 g. of an emulsifier that is soluble in xylene is dissolved in 50 cc. of xylene, and the resulting solution is made up to 100 cc. with xylene. In this manner, a spray broth concentrate is obtained which can be diluted with water in any desired proportion.

EXAMPLE 3

The following types of plant are sown: Triticum, Hordeum, Sorghum, Panicum, Poa, Dactylis, Beta, Calendula, Linum, Daucus and Soya.

1 day after seeding, the fields thus sowed are treated with a spray broth according to Example 2. The amount of active substance applied was 5 kg. per hectare.

On evaluation of the results 21 days after the treatment the following valves were recorded:

| Plant tested: | Evaluation |
|---|---|
| Triticum | [1] 0 |
| Hordeum | 0 |
| Sorghum | 8 |
| Panicum | 9 |
| Poa | [2] 10 |
| Beta | 0 |
| Colendula | 1 |
| Linum | 0 |
| Daucus | 0 |
| Soya | 0 |

[1] 0=No effect (as control plant).
[2] 10=Plant completely destroyed.

The product described may be specially used for the control of certain undesired types of grass among the various kinds of grain cultures, or other grass cultures (for example in planting grass seeds).

EXAMPLE 4

A greenhouse test was carried out by planting *Setaria italica* in pots.

On the day after seeding, the compounds No. 4 and No. 6, formulated as described in Example 2, were sprayed into the pots in an amount equivalent to 5 kg. of active substance per hectare. 20 days after this spraying, the following result was recorded:

Both compounds killed *Setaria italica* off. The substances Nos. 3, 5, 7 and 8 had a similar effect. The specific activity against *Setaria italica* is desirable wherever this weed can develop on an excessive scale owing to the absent effect of conventional herbicides.

What is claimed is:
1. A compound of the formula

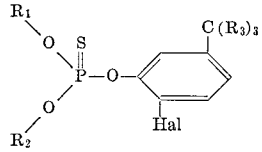

wherein $R_1$ and $R_2$ each represents alkyl containing at most 5 carbon atoms, Hal represents a member selected from the group consisting of chlorine, bromine and iodine, and $R_3$ represents lower alkyl.

2. The compound of the formula

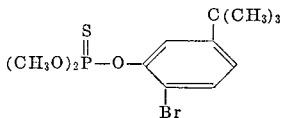

3. The compound of the formula

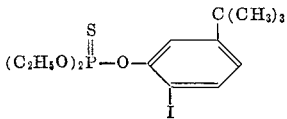

References Cited

UNITED STATES PATENTS 2,870,186   1/1959   Orloff et al. _____ 260—964

FOREIGN PATENTS 255,279   2/1963   Australia.

CHARLES B. PARKER, Primary Examiner

R. L. RAYMOND, Assistant Examiner

U.S. Cl. X.R.

260—960, 961, 973; 424—222, 225